US008805187B2

(12) United States Patent
McGreer

(10) Patent No.: US 8,805,187 B2
(45) Date of Patent: Aug. 12, 2014

(54) WAVELENGTH ROUTER WITH FEEDBACK CONTROL COMPRISING OPTICAL MONITOR PORTS

(75) Inventor: Kenneth McGreer, Livermore, CA (US)

(73) Assignee: Neophotonics Corporation, San Jose, CA (US)

( * ) Notice: Subject to any disclaimer, the term of this patent is extended or adjusted under 35 U.S.C. 154(b) by 134 days.

(21) Appl. No.: 13/423,453

(22) Filed: Mar. 19, 2012

(65) Prior Publication Data

US 2013/0243432 A1 Sep. 19, 2013

(51) Int. Cl.
*H04J 14/00* (2006.01)
*H04J 14/02* (2006.01)

(52) U.S. Cl.
USPC ............................ 398/49; 398/95; 398/196

(58) Field of Classification Search
USPC .................... 398/33, 49, 93, 95, 195, 196
See application file for complete search history.

(56) References Cited

U.S. PATENT DOCUMENTS

| 5,617,234 | A | * | 4/1997 | Koga et al. ................. 398/14 |
| 6,516,119 | B2 | | 2/2003 | Menezo et al. |
| 6,868,200 | B2 | * | 3/2005 | Kimotsuki et al. ............ 385/24 |
| 7,751,658 | B2 | * | 7/2010 | Welch et al. .................. 385/14 |

OTHER PUBLICATIONS

F. Tong et al., "A Wavelength-Matching Scheme for Multiwavelength Optical Links and Networks Using Grating Demultiplexers", IEEE Photonics Technology Letters, vol. 7, No. 6, Jun. 1975, pp. 688-690.
Katsunari Okamoto, "Fundamentals of Optical Waveguides", Second Edition, Okamoto Laboratory Ltd, Ibaraki, Japan, 2006, pp. 490-495.
I. Zacharopoulos et al., "Optimization Study of Advanced Modulation Formats for 10-Gb/s Metropolitan Networks", Journal of Lightwave Technology, vol. 23, No. 1, Jan. 2005, pp. 321-329.
* Yutka Miyamoto et al., "Novel Modulation and Detection for Bandwidth-Reduced RZ Formats Using Duobinary-Mode Splitting in Wideband PSK/ASK Conversion", Journal of Lightwave Technology, vol. 20, No. 12, Dec. 2002, pp. 2067-2078.

* cited by examiner

*Primary Examiner* — Dalzid Singh
(74) *Attorney, Agent, or Firm* — Buchanan Ingersoll & Rooney PC

(57) ABSTRACT

An optical waveguide router device with feedback control that uses the fringe frequencies of an optical data signal to derive a wavelength (e.g., temperature) control signal in order to compensate for wavelength variations due to temperature fluctuations and/or other wavelength shifting factors without the need for a reference laser. A monitoring circuit converts an output of at least one output monitoring port to an electrical signal and comparing the output of said at least one output monitoring port against 1) a reference signal, or 2) at least one output from another output monitoring port having a higher or lower frequency fringe of an optical data signal of at least one data port, or 3) at least one output from another output monitoring port having light from diffraction pattern(s), and outputting a control signal reflecting a result of the comparison to control at least one center wavelength of the waveguide router.

25 Claims, 6 Drawing Sheets

WAVELENGTH ROUTER WITH FEEDBACK CONTROL COMPRISING OPTICAL MONITOR PORTS

FIELD OF THE DISCLOSURE

The present invention relates to a wavelength router usable in an optical network, and, more particularly, to temperature monitoring and wavelength compensation within the wavelength router,

DESCRIPTION OF RELATED ART

FIG. 1(A) illustrates a conventional wavelength router with a thermal control. It includes an arrayed waveguide grating (AWG) 100. The AWG 100 comprises at least one input waveguide 101 that is optically coupled to one end of a multiple of grating waveguides 103 via an input slab waveguide 102. The input slab waveguide 102 may equally be referred to as a free space region. The other end of the grating waveguides 103 are optically coupled to at least one output waveguide 105 via an output slab waveguide 104. The output slab waveguide 104 may equally be referred to as a free space region. In operation, light may enter the input waveguide 101, traverse the input slab waveguide 102 and propagate through the grating waveguides 103. Because the grating waveguides 103 have different lengths, light emerges from each grating waveguide with a different phase. The grating waveguides 103 are optically coupled to the input edge of the output slab waveguide 104. The light then propagates across the output slab waveguide 104 and is focused onto the output edge of the output slab waveguide 104. For each particular diffraction order, each wavelength of light is focused to a particular spot along the output edge of the output slab waveguide 104. Assuming that the input waveguide 101 is optically coupled to the pole of the input slab waveguide 102, the relationship between the each wavelength of light and the location to which it is focused can be described by the equation $$m\lambda = n_c \Delta L + n_s dx/R.$$ Eq. 1 where m is an integer referred to as the diffraction order, $n_c$ is the effective index of the grating waveguides, $\Delta L$ is the length difference between adjacent grating waveguides, $n_s$ is the effective index of the output slab waveguide 104, d is the distance between grating waveguides 103 along the input edge of the output slab waveguide 104, R is the length of the output slab waveguide 104, and x is the distance from the pole along the output edge of the output slab waveguide 104 to the spot to which light of wavelength $\lambda$ is focused. An output waveguide 105 that is optically coupled to the output edge of the output slab waveguide 104 at a distance from the pole given by x, can be used to collect light of wavelength $\lambda$ given by the above equation. More generally, an output waveguide 105 will collect light over a range of wavelengths, referred to as a 'passband', for each diffraction order. Each passband thus defines a range of wavelengths about a center wavelength that is determined by x, the location of the output waveguide, via the relationship described by Eq. 1 above. Because wavelength, $\lambda$, and optical frequency, $v$, are related by $v\lambda = c$, where c is the speed of light in vacuum, each passband could equivalently describe a range of optical frequencies about a center frequency that is determined by x, the location of the output waveguide 105. When configured with a single input waveguide and a plurality of output waveguides, the AWG comprises a demultiplexer. When configured with a plurality input waveguides and a single output waveguide, the AWG comprises a multiplexer. The general case with any number of input waveguides and any number of output waveguides is an example of a wavelength router.

It is known that, depending on the materials used and other factors, the spectral response of these types of devices can be influenced by temperature fluctuation or shifts. Hence, as depicted in FIG. 1(a), a temperature sensor 106 detects the local temperature of the AWG 100 and outputs a corresponding electrical voltage. For example, the temperature sensor 106 may include a thermistor, having a resistance that decreases in response to an increasing temperature, and associated electrical circuitry that outputs a voltage that decreases as the thermistor resistance decreases. This output voltage is input to a control circuit (e.g., a comparator) 108, the other input of which receives an electrical signal from a reference signal generator 107. Hence, FIG. 1(a) illustrates wavelength router including an AWG 100 and a control circuit 108 to maintain an optimum temperature of the AWG 100. The conventional control circuit 108 derives a signal from a temperature sensor 106 and provides an electrical response that can be determined by a present value of signal from the temperature sensor 106 and optionally from historic information. In the simplest form (proportional control) the temperature sensor signal is subtracted from a reference value, amplified and applied to a heater 109 attached to the AWG 100.

That is, if the signal resulting output from the temperature sensor 106 on the AWG 100 is lower than the reference signal, the result of the comparator 108 is an electrical drive signal causing a heating element 109 to heat up the AWG 100 substrate until the temperature measurement signal matches the reference signal. Of course, if the temperature measurement signal is higher than the reference signal, the heating element is driven with a reduced power or is turned off, and the AWG 100 can cool down. Generally, the ambient temperature is kept below the ideal operating temperature of the AWG 100 to allow for this control by means not shown, such as air conditioning in the room in which the device operates. This type of control does not automatically adjust for manufacturing tolerances or device degradation, and the reference signal may need to be adjusted and potentially readjusted to meet the device and/or system requirements.

A planar lightwave circuit (PLC) device disclosed in Tong, et al., "A Wavelength-Matching Scheme for Multiwavelength Optical Links and Networks Using Grating Demultiplexers," IEEE Photonics Tech, Letters, Vol. 7, No. 6, June 1995, which specifically states that two of the output waveguides need to be dedicated for sensing optical signals that form part of a feedback loop used to control the temperature of the planar echelle grating. Tong et al. further state that the scheme requires a reference laser and that the reference laser $\lambda_{ref.}$ must be very stable and accurate and located in a node or a central office for networks. FIG. 1(b) illustrates a wavelength-matching scheme for multiple wavelength optical links using grating to demultiplexers. As depicted, light entering an input port 111 of a planar lightwave circuit (PLC) 110 impinges on an etched grading 113 and reflects as spectrally separated light onto an output port 114. The output port 114 permits the spectrally separated light to be transmitted through channels 115 $\lambda_1$ through 115 $\lambda$n. Among these output ports are two that are connected to a pair of photodiodes for receiving a reference light from a reference light (laser) source, not shown. When the PLC 110 is at a temperature such that equal optical powers enter each of the photodiodes in the pair, the PLC is said to be in the "wavelength-matched state." Each photodiode respectively converts the reference light of a discrete wavelength to an electrical signal. The resulting electrical signals from the converted light signals are input to respective logarithmic amplifiers. In combination, the photodiodes and amplifiers constitute a photo detector circuit 116. Each output arm of the photo detector circuit 116 is then input to a comparator 118.

The ratio in the received power of the λ reference from the two outputs forming feeding the photo detector circuit 116 drives a thermoelectric cooler 119 via a servo circuit 120 to the wavelength-matched state. One drawback of this type of system is that a reference laser is required.

U.S. Pat. No. 6,868,200, issued to Kimotsuki et al. on Mar. 15, 2005, discloses a method to monitor and temperature compensate for changes in wavelength within an AWG. The Kimotsuki device includes a light emitting means for generating pilot signal that is optically coupled to an input dummy port and a light detecting means that is optically coupled to a dummy output port. The method uses the output of the detecting means in a feedback loop that controls the AWG temperature to cancel the wavelength fluctuation occurring within the AWG. One drawback of this type of system is that it requires a light emitting means to generate a pilot signal.

Another exemplary patent, also with the drawback of requiring a reference optical signal, is U.S. Pat. No. 5,617,234, issued to Koga et al. on Apr. 1, 1997.

A similar disclosure appears in Katsunari Okamoto, Fundamentals of Optical Waveguides (second edition), Elsevier, 2006, pages 490-495, which discusses wavelength monitoring and stabilization using two monitor ports. The multiple wavelengths simultaneously monitoring is based on the AWG operating principle that two diffraction beams appear when light is coupled to the off-center input port such that if the transmission loss on one monitor becomes larger than that of the other monitor, an error signal for the wavelength matching can be obtained from the loss difference without dithering the monitored light.

The types of devices using a reference laser are disadvantageous in the context of requiring an optical reference signal for monitoring the effects of temperature or other wavelength altering influences on a wavelength router (such as an AWG or a planar echelle grating or an optical demultiplexer or an optical multiplexer), or the system in which a wavelength router exists, and these can be relatively complex.

SUMMARY OF THE INVENTION

The presently disclosed device is a wavelength router device with feedback control that includes a wavelength router with an input port and at least one output data port and at least one output monitor port. Each of one or more data ports and monitor ports output a different light frequency with respect to the other. A monitoring circuit converts an output of at least one output monitoring port to an electrical signal and comparing the output of at least one output monitoring port against 1) a reference signal, or 2) at least one output from another output monitoring port (wherein one of the frequencies of the outputs of the output monitoring port or ports is compared is higher frequency fringe of an optical data signal of at least one data port and another one of the frequencies of the outputs of the output monitoring ports being compared is a lower frequency fringe of an optical data signal of at least one data port), or 3) at least one output from another output monitoring port (wherein one outputs of the output monitoring port or ports is coupled to light from one order of the diffraction pattern and another of the outputs of the output monitoring port or ports is coupled to light from another order of the diffraction pattern); and outputs of two output monitoring ports against respective outputs of two output data ports wherein each output data port is associated with one of the output monitoring ports, and outputting a control signal reflecting a result of the comparison. A center wavelength controller controlling the output center wavelength of at least one output data port of demultiplexer according to the control signal from the monitoring circuit.

BRIEF DESCRIPTION OF THE DRAWING FIGURES

The present method and device will be more clearly understood from the description of exemplary embodiments to which the claimed invention is not limited, as set forth below with reference to the accompanying drawings.

FIG. 1(*b*) depicts prior art wavelength routers that include a thermal controller.

FIGS. 4(*a*)-4(*d*) Insertion Loss (IL) diagrams for passbands of the first monitor port (right), the second monitor port (left) and the data port (center) (FIG. 4(*a*)); and the power spectra density for the optical signal when $\Delta v=0$ (FIG. 4(*b*)), for when $\Delta v>0$ (FIG. 4(*c*)) and for when $\Delta v<0$ (FIG. 4(*d*)). FIG. 4(*e*) illustrates an exemplary output of the monitor combiner. The monitor combiner circuit provides an output that completes a feedback loop to restore the AWG temperature to the optimum value.

Figure 5A:
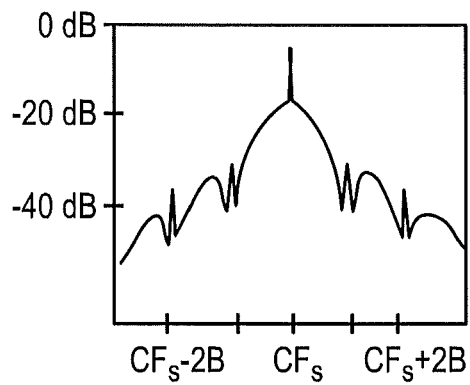
Figure 5B:
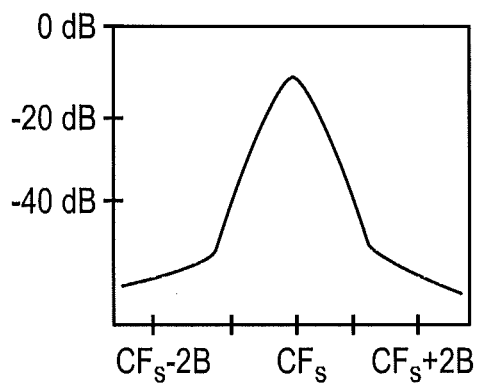

FIGS. 5*a* and 5*b* depict typical power spectral densities for modulated optical data signals. FIG. 5*a* depicts a typical spectrum for when a non-return-to-zero (NRZ) modulation format is used. FIG. 5*b* depicts a typical spectrum for when a duo-binary (DB) modulation format is used.

Figure 6:
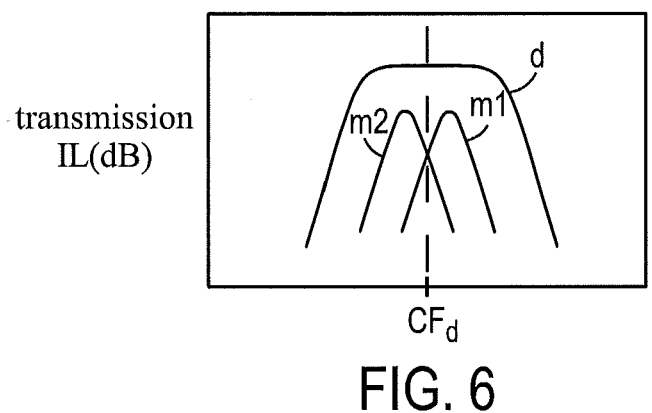

FIG. 6 illustrates the passbands for the data port d, the first monitor port m1 and the second monitor port m2 for the arrangement for which $CF_{m1}=CF_d+BW_m/2$ and $CF_{m2}=CF_d-BW_m/2$.

Figure 7:
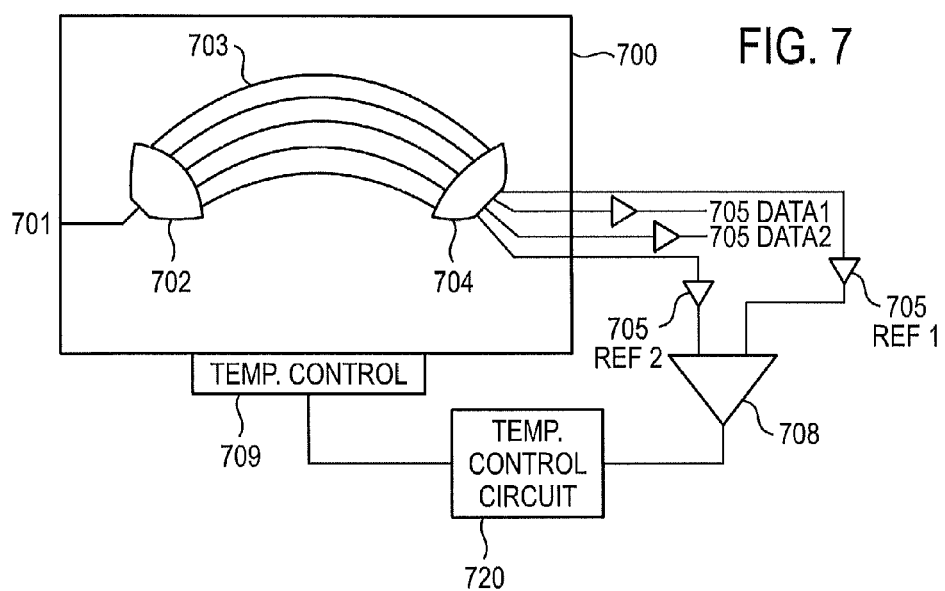

FIG. 7 depicts a device in accordance with the present disclosure having multiple data signals, e.g., one optical signal centered at $CF_{s1}$ and a second optical signal centered at $CF_{s2}$.

Figure 8A:
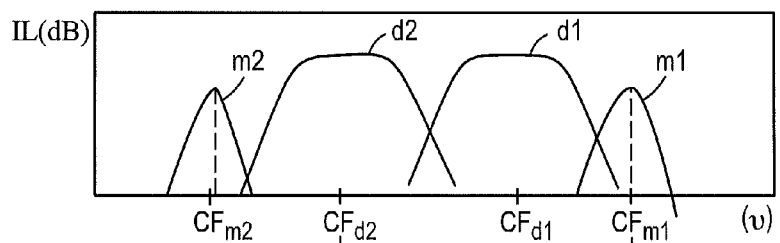
Figure 8B:
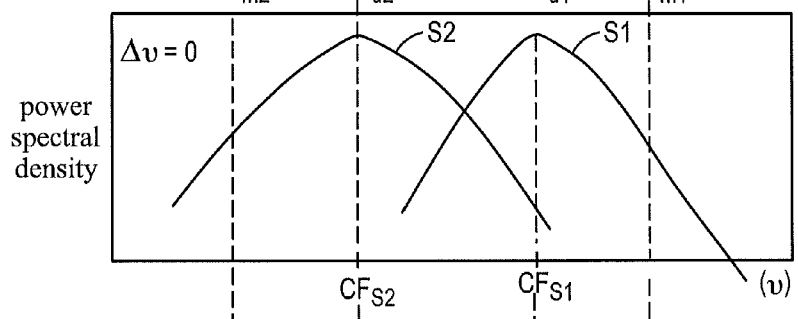
Figure 8C:
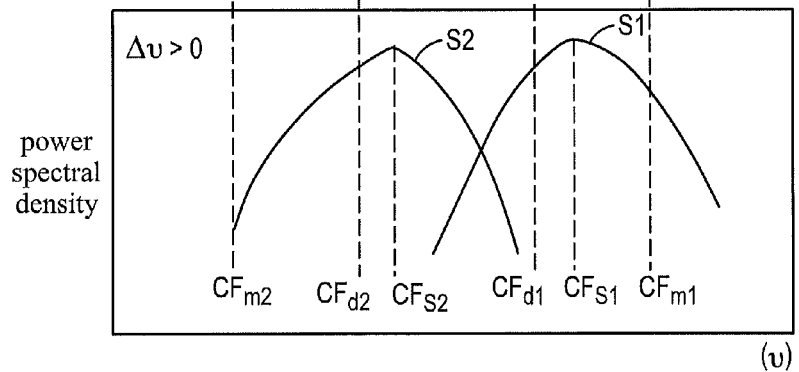

FIGS. 8*a*, 8*b* and 8*c* illustrate the plots of insertion loss (IL) and power spectral density for an embodiment with two data ports.

DETAILED DESCRIPTION OF DISCLOSED EMBODIMENTS

Figure 1A:
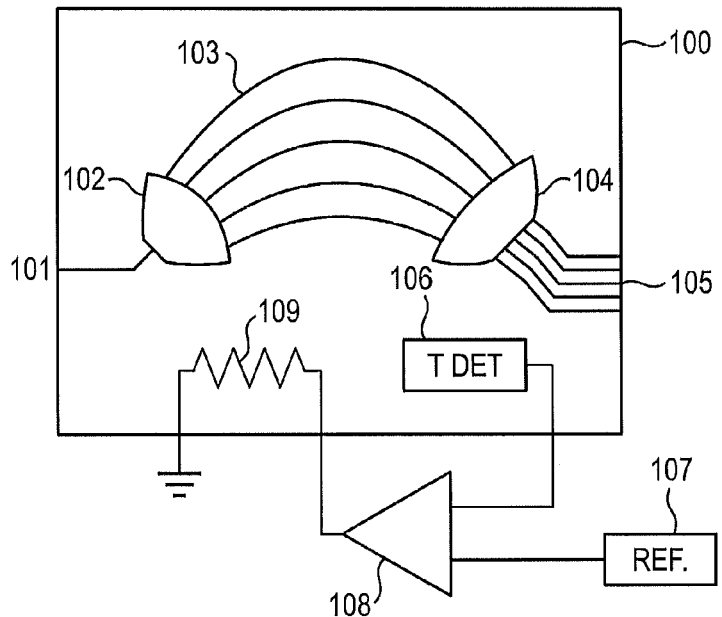
FIG. 1(*a*) depicts prior art wavelength routers that include an Arrayed Waveguide Grating (AWG) and a thermal controller.
Figure 1B:
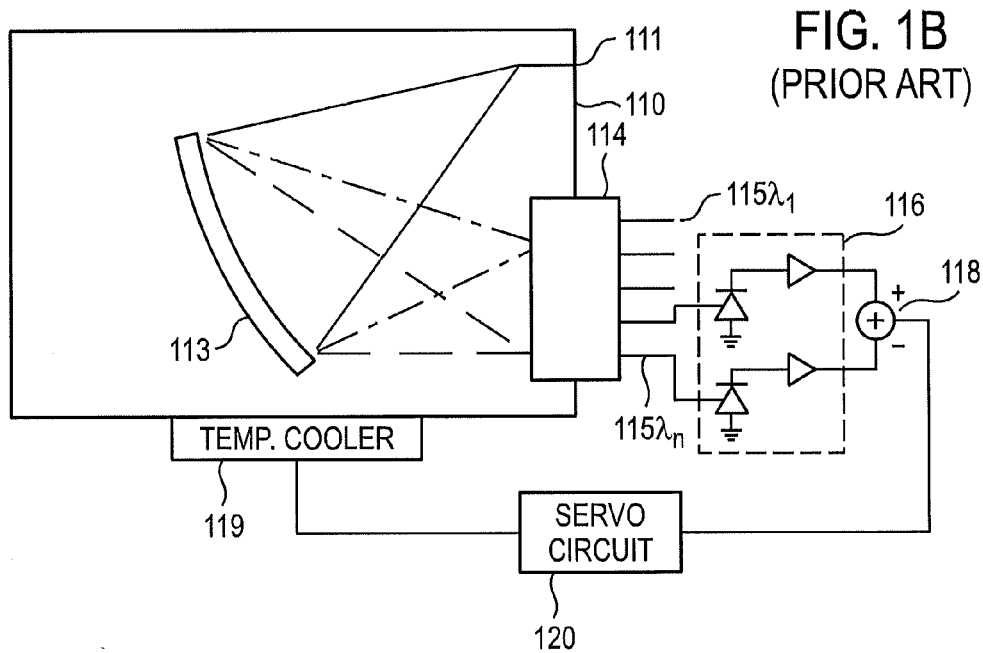
Figure 2:
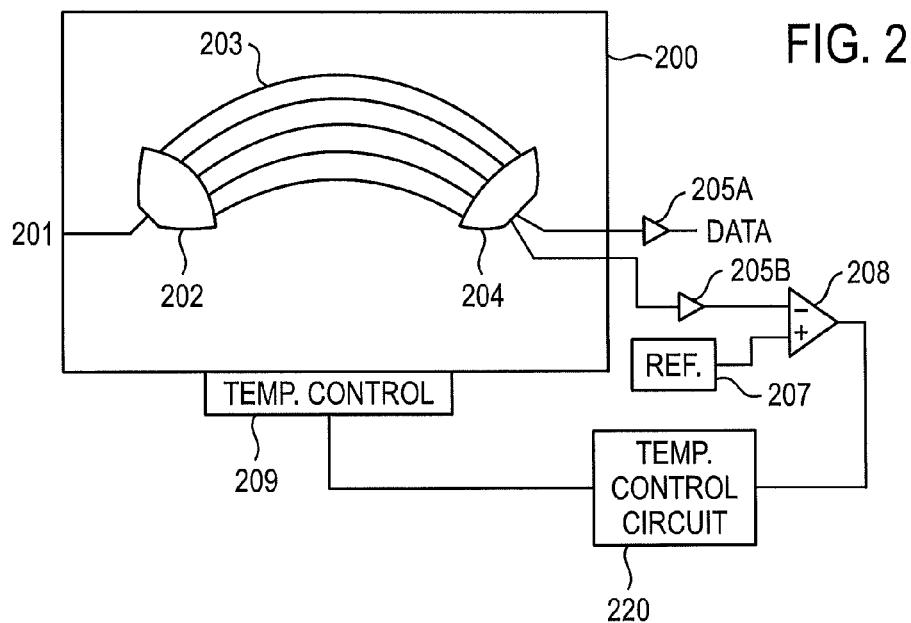
FIG. 2 depicts a device in accordance with the present disclosure with a single monitor port where an AWG is used as a demultiplexer.

FIG. 2 depicts the device with a single monitor port 201 where an AWG 200 is used as a wavelength router. In this, and all other embodiments, other forms of wavelength routers can be used, whether temperature dependent or not, insofar as the present device and method can adjust for both changes in the wavelength characteristics of the optical signal and changes in the physical properties of the wavelength router which may be a result of both variations in temperature and variations in wavelength response due to other factors such as manufacturing tolerances. These forms of wavelength router include bulk-optical gratings, etched grating or other forms of diffraction-based wavelength routers, Mach-Zehnder and Michelson interferometers, Fabry-Pérot interferometer (etalon) demultiplexers, and nearly any suitable optical element that spreads a spectrum continuously.

A modulated optical data signal enters the input port 201 of the AWG 200. Herein, the term "port" should be viewed as a generic term describing an object by its function, rather than a particular type of input/output device or structure insofar as any suitable device or structure is contemplated. In this depiction, only one input port is shown, but both documents with more than one is envisioned. The light (from the optical data signal) traverses an input slab waveguide 202 and enters an array of grating waveguides 203. The grating waveguides 203 have different lengths and thus apply a different phase shift at the exit of each waveguide 203. The light traverses an output slab waveguide 204 and is optically coupled into the output waveguides 205 in such a way that the optical coupling to each output waveguide is wavelength dependent, as described above. The set of output waveguides includes at least one data port from which the modulated optical signal is translated back into the original data for example and at least one monitor port. The data port has a passband which can be characterized in optical frequency as being centered at the center frequency of the passband, $CF_d$, and having a bandwidth, $BW_d$.

Some of the present exemplary embodiments depend on the fact that a modulated optical signal is characterized by a power spectral density (also referred to as the spectrum or the power spectrum) that extends over a range of optical wavelengths (or, equivalently, over a range of optical frequencies) as illustrated in FIGS. 5a and 5b. The details of the spectrum are determined in part by the modulation format as explained and exemplified with further details in I. Zacharopoulos, A. Tzanakaki, D. Parcharidou, and I. Tomkos, "Optimization Study of Advanced Modulation Formats for 10-Gb/s Metropolitan Networks," IEEE Journal of Lightwave Technology, vol. 23, no. 1, Pp. 321-329, 2005. FIG. 5a shows a typical spectrum for a Non-Return-to-Zero (NRZ) modulation format and FIG. 5b shows a typical spectrum for a duobinary (DB) modulation format. In order for original data to be accurately recovered from the data port, the data port must have a passband that collects light over a range of optical frequency that at least includes the range from $CF_s-BW_s/2$ to $CF_s+BW_s/2$, where $CF_s$, is the center frequency of the spectrum and $BW_s$ is the bandwidth of the spectrum. Typically, the spectrum extends beyond this range, light outside this range could also be collected by the data port, or alternatively, may be diverted to another port. The bandwidth of the data port depends on the modulation format and other details. For example, NRZ modulation formats $BW_s=2B$, where B is the bit rate of the data used to modulate the optical signal and or DB modulation formats $BW_s=B$. Yutaka Miyamoto, Akira Hirano, Shoichiro Kuwahara, Masahito Tomizawa, and Yasuhiko Tada, "Novel Modulation and Detection for Bandwidth-Reduced RZ Formats Using Duobinary-Mode Splitting in Wideband PSK/ASK Conversion," Journal of Lightwave Technology, vol. 20, no. 12, Pp. 2067-2078, 2002. In order for original data to be accurately recovered from the data port, $BW_d$, must be equal to or greater than $BW_s$. Herein, tuning refers to the process of controlling the wavelength router such that the center frequency of spectrum matches the center frequency of the passband of the data port. When the center frequency of the spectrum, $CF_s$, matches the center frequency of the passband of the data port, $CF_d$, the wavelength router is said to be "in tune" or, equivalently, "correctly tuned."

The present exemplary embodiments operate on a premise different than that of conventional devices, described above, using a reference light source or reference temperature. The present exemplary embodiments monitor the center frequency of the actual optical spectrum, $CF_s$, relative to the center frequency of the passband of the data port, $CF_d$, by collecting at least one portion of the optical data signal into a monitor port or ports as part of the mechanism tune the device. The monitor port has a passband which can be characterized in frequency as being centered at the center frequency of the passband, $CF_m$, and having a banwidth, $BW_m$.

The entire optical data signal is spatially separated by an optical device into at least two portions. One portion (herein refered to as the fundamental portion) is spatially directed to a location wherein it is optically coupled to a data port so that it may be converted to an electrical signal by the data receiver (DR) 205A. A second portion (herein referred to as a fringe of the data signal) is spatially directed to a monitor port so that it may be converted into an electrical signal at the monitor receiver (MR) 205B. Data receivers and monitor receivers of the various embodiments disclosed herein include an optical-to-electrical signal converter (e.g., a photodiode) and an optional electrical signal amplifier (whether analog or digital), as one example.

The AWG 200 is at an optimum temperature when the AWG is correctly tuned as defined above and the tuning frequency error, $\Delta v$, equals zero, where $\Delta v = CF_d - CF_s$.

When the AWG temperature deviates from the optimum value by $\Delta T$, the AWG is "out of tune" and $\Delta v$ is nonzero. The value of $\Delta v$ varies monotonically (and approximately linearly) with $\Delta T$. For simplicity, value of $\Delta v$ is assumed to vary linearly with $\Delta T$; however, the results can easily be applied to case where of $\Delta v$ has a nonlinear dependence on $\Delta T$. The monitor port is configured so that the MR 205B provides an output that varies monotonically with $\Delta v$ over a range of values for $\Delta v$ that is herein referred to as the "tuning range." The value of the output from the monitor receiver may be expressed in units of voltage, for example. For simplicity, value of output from the MR is assumed to vary linearly with $\Delta v$ within the tuning range; however, the results can easily be applied to case where the value of the MR output has a nonlinear (yet still monotonic) dependence on $\Delta v$. Hence, the monitor port is configured so that the MR 205B provides an output that varies linearly with $\Delta T$ within the tuning range. Suitable monitor port configurations are described below.

The output of the MR 205B is subtracted from a reference value provided from a reference value generator 207 by the monitor combiner 208. The reference value is selected to be equal to the output of the MR 205B when $\Delta v=0$, hence the output of the monitor combiner 207 is proportional to $\Delta v$. In the present exemplary embodiment, the reference is said to be a "fixed reference" which herein means that it is independent of any light that may or may not enter the device. The reference value can be adjusted or readjusted for the specific device if a greater degree of accuracy is desirable, or set to a standard value if manufacturing tolerances and other factors do not vary from device to device to make a substantive difference for a particular application.

The output of the monitor combiner drives a tuning circuit (eg. a heater driver or heater control circuit) 220 such that the tuning element (eg. a heater or temperature controller) 209 dissipates a power proportional to $\Delta v$. It should be noted that the temperature controller 209 can be a heater, particularly if the ambient temperature is lower that of the optimal temperature of the device, but can be a thermal electric device capable of both heating and cooling, or cooling if the ambient temperature to the device is higher than the optimal temperature of the device.

In the embodiment that uses a heater for the tuning element, the heater 209 is attached to the AWG 200 so that the AWG temperature increases linearly with the power dissipated by the heater 209. Hence, the AWG 200, monitor port, MR 205B, monitor combiner 208, heater driver 220, and heater 209 constitute a proportional feedback loop. The monitor combiner 208 and heater driver 220 can be fully implemented with analog electronics. Alternatively, part of the electronics of these components may be implemented with digital electronics. Modifications may be made to make the feedback loop into a conventional proportional-integral-derivative controller (PID controller) loop, for example, rather than a simple proportional feedback loop.

The monitor port can be configured so that the MR 205B provides an output that varies monotonically with $\Delta v$. One suitable arrangement for all of the exemplary embodiments herein is to arrange the AWG 200 so that the center frequency of the passband for the monitor port, $CF_m$, differs from the center frequency of the passband of the data port, $CF_d$, by approximately $BW_s$ (for example, $CF_m = CF_d - BW_s$ and $BW_m = 0.2 BW_s$) so that the monitor port may collect a portion of spectrum that is not collected by the data port. (The difference between $CF_m$ and $CF_d$ remains unchanged even as the AWG becomes out of tune, i.e., even when $CF_s$ differs from $CF_d$.) In this example, the data port is configured to collect a portion of the spectrum that is most important for the process of recovering the original data from the collected light without interfering with the function of the monitor port. When the AWG is in tune, the monitor port collects a small portion of the spectrum near $CF_s - BW_s$. If $CF_s$ increases relative to $CF_d$ (i.e., $\Delta v$ becoming increasingly negative), then the monitor port collects a portion of the spectrum (that is, a fringe) that is further from $CF_s$ hence the amount of light collected by the monitor port decreases and the monitor signal decreases. Conversely, if $CF_s$ decreases relative to $CF_d$ (i.e., $\Delta v$ becoming increasingly positive), then the monitor port collects a portion of the spectrum (that is, a fringe) that is closer to $CF_s$, hence, the amount of light collected by the monitor port increases and the monitor signal increases. Consequently, the monitor signal varies monotonically with $\Delta v$. In this configuration, for example when the AWG is $CF_d = CF_s$, and $CF_m = CF_s - BW_s$, the values of $CF_d$ have a large enough difference to ensure that the output waveguides for the data port and the monitor port, as dictated by Eq. 1, are sufficiently separated to prevent a conflict with respect to their relative location within the diffraction pattern even when they are configured to collect light from the same diffraction order. Equivalently, the monitor port may collect a portion of the optical data signal that is not collected by the data port comprising a portion of the spectrum near $CF_s + BW_s$ (for example, $CF_m = CF_s + BW_s$ and $BW_m = 0.2 BW_s$).

In a second suitable arrangement, the monitor may collect light within the range from $CF_s - BW_s/2$ to $CF_s + BW_s/2$ that is not collected by the data port. In this example, if the data port and the monitor port collect light from the same diffraction order of the optical data signal, the physical separation, dictated by Eq. 1, between that output waveguides associated with the data port and the monitor port respectively may become too small to practically implement. This issue may be resolved in this example, by having the monitor port collect aportion of the optical signal (a fringe) that is diffracted into a different diffraction order than the light that is collected by the data port. That is, the data port may comprise an output waveguide that is coupled to the output edge of the output slab waveguide at location $x_d$ according to $$m_d c / CF_d = n_c \Delta L + n_s d x_d / R,$$

where $m_d$ is the diffraction order of the modulated optical signal that is collected by the data port and the monitor port may comprise an output waveguide that is coupled to the output edge of the output slab waveguide at location $x_m$ according to $$m_m c / CF_m = n_c \Delta L + n_s d x_m / R,$$

where $m_m$ is the diffraction order of the modulated optical signal that is collected by the monitor port, and either $m_m = m_d + 1$ or $m_m = m_d - 1$. In this example, the monitor port may collect light from a portion of the spectrum that is also collected by the data port (i.e., the difference between $CF_d$ and $CF_m$ may be smaller than $BW_s/2$), but collect light that is not collected by the data port by collecting light from a different diffraction order. In particular, the AWG can be configured such that $CF_m = CF_d - BW_m/2$, where $BW_m$ is smaller that $BW_s$. As described above, the monitor signal would vary monotonically with $\Delta v$. Equivalently, the AWG may be configured such that $CF_m = CF_d + BW_m/2$, where $BW_m$ is smaller that $BW_s$. A configuration with $CF_m = CF_d$ would not be preferable because the monitor signal would have a local maximum when the AWG is in tune; consequently, the monitor signal would have a non-monotonic dependence on $\Delta v$.

In this way, the tuning procedure is not dependent on manufacturing tolerances or, in the cases of the exemplary embodiments of FIGS. 4 and 8, power input.

Figure 3:
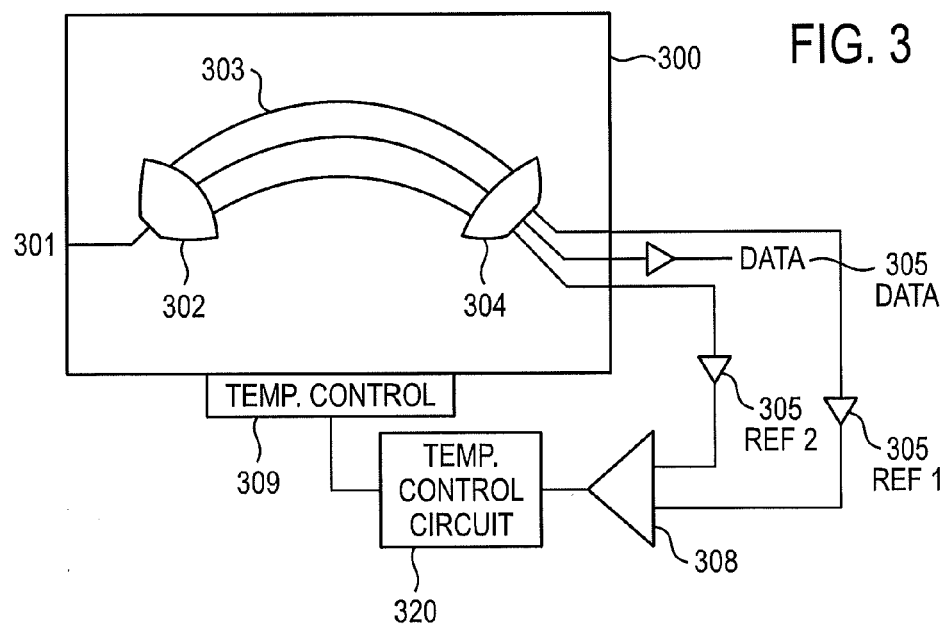
FIG. 3 depicts a device in accordance with the present disclosure with two monitor ports where an AWG is used as a demultiplexer.

FIG. 3 depicts a device similar to that of FIG. 2 with the exception that the reference input of FIG. 2 is derived from a second monitor port and monitor receiver 305Ref2. That is, as with the embodiment of FIG. 2, a modulated optical signal enters the input port 301 of the AWG 300. Again, only one input port is shown, but more than one is possible depending on embodiment. The light traverses the input slab waveguide 302 and enters an array of grating waveguides 303. The grating waveguides 303 have different lengths and thus apply a different phase shift at the exit of each waveguide 303. The light from the optical data signal traverses the output slab waveguide 304 and is optically coupled into the output waveguides 305 in such a way that the optical coupling to each output waveguide is wavelength dependent, as described above. The set of output waveguides includes at least one data port from which the modulated optical signal is translated back into the original data and at two monitor ports. The entire optical data signal is spatially separated by an optical device into at least three portions. One portion (the fundamental portion) is spatially directed to a location wherein it is optically coupled to a data port so that it may be converted to an electrical signal by the data receiver (DR) 305A. A second portion, comprising optical frequencies greater than the fundamental portion, (herein referred to as a higher frequency fringe of the data signal) is spatially directed to a monitor port so that it may be converted into an electrical signal at the first monitor receiver (305 Ref1). A third portion, comprising optical frequencies lower than the fundamental portion, (herein referred to as a lower frequency fringe of the data signal) is spatially directed to a monitor port so that it may be converted into an electrical signal at the second monitor receiver (305 Ref2).

In this depiction, the output of the monitor receiver 305Ref1 is subtracted from the output of the monitor receiver 305Ref2 by the monitor combiner 308. The two monitor ports are configured symmetrically about the data port so that, when the AWG is in tune (i.e., $\Delta v=0$), the output of the two monitor receivers 305Ref1 and 305Ref2 are equal to each other and the output of the monitor combiner is zero. Of course, offsets can be accommodated where desirable, such as when having symmetry about the data port is not an optimal implementation, for instance. When the AWG is not in tune, the output of the two monitor receivers 305Ref1 and 305Ref2 are unequal and the output of the monitor combiner is nonzero. Generally, the output of the monitor combiner 308 is proportional to $\Delta v$.

Figure 4A:
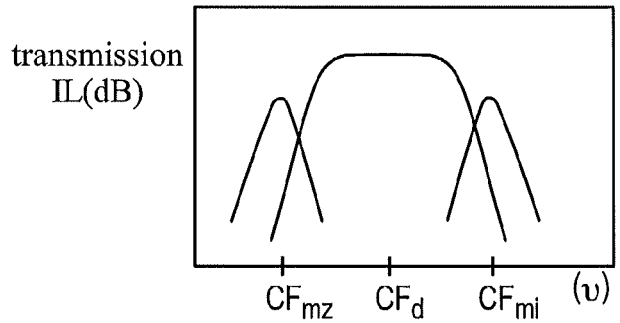
Figure 4B:
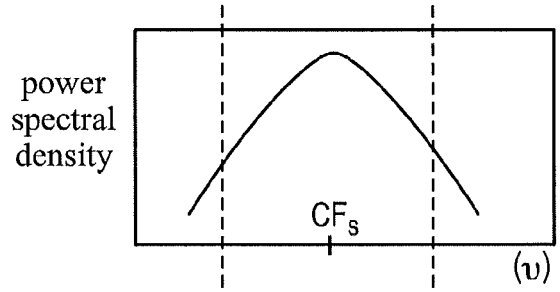
Figure 4C:
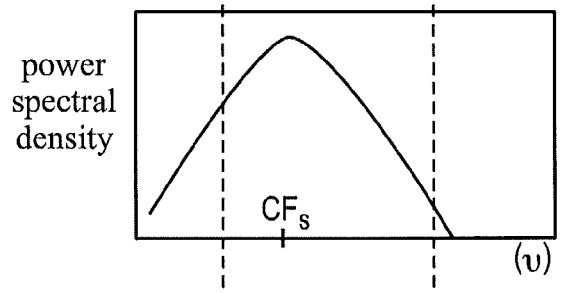
Figure 4D:
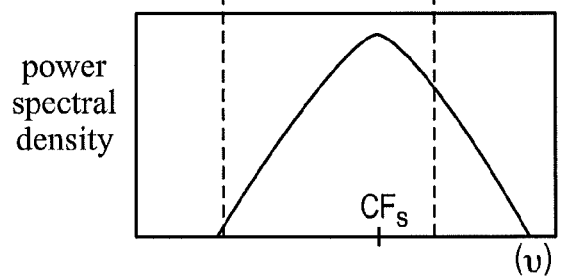

FIG. 4(a) shows passbands of the first monitor port (right), the second monitor port (left) and the data port (center), each of which is expressed in terms of insertion loss (IL) values. The power spectra density for the optical signal when $\Delta v=0$ is shown in FIG. 4(b), for when $\Delta v>0$ is shown in FIG. 4(c), and for when $\Delta v<0$ is shown in FIG. 4(d). In this example, $CF_{m1}=CF_d+BW_s$, and $CF_{m2}=CF_d-BW_s$, where $CF_{m1}$ is the center frequency of the passband of the first monitor port and $CF_{m2}$ is the center frequency of the passband of the second monitor port.

The illustrated power spectra density depicts a typical curve for a modulated optical data signal. For $\Delta v=0$, the power spectral density of the optical signal is symmetric about its own center frequency, $CF_s$ (as shown in FIG. 4b) and the center frequencies $CF_{m1}$, and $CF_{m2}$ of the monitor channels are symmetrically placed about the center frequency of the data port passband $CF_d$ (as shown in FIG. 4a). Hence, MR 305Ref1 and MR 305Ref2 will have equal responses to the optical signal when $\Delta v=0$. When $\Delta v>0$ as shown in FIG. 4c, the first monitor port will receive more optical power than the second monitor port, hence the monitor combiner will have a negative output. Conversely, as in 4d, when $\Delta v<0$ the monitor combiner will have a positive output. The output of the monitor combiner of this exemplary embodiment is as shown in FIG. 4c, but it should be noted that a graph of the output can have other forms that pass through zero. Of course, as mentioned before, a lack of symmetry can be accommodated by the use of offsets to the inputs of the monitor combiner 308.

When the monitor combiner 308 has a zero output, the heater driver (temperature control circuit) 320 will supply the heater 309 with an equilibrium current which is sufficient to maintain the state with $\Delta v=0$. When either $\Delta v>0$ or $\Delta v<0$, a non-zero output of the monitor combiner will raise or lower the heater driver current to restore equilibrium.

FIG. 6 illustrates the passbands and power spectral density for the arrangement for which $CF_{m1}=CF_d+BW_m/2$, and $CF_{m2}=CF_d-BW_m/2$, where $BW_m<BW_s$. To accommodate the relatively small difference between $CF_{m1}$ and $CF_d$, the first monitor port may collect light from the $m_d+1$ diffraction order, where $m_d$ is the diffraction order from which the data port collects light. Similarly, to accommodate the relatively small difference between $CF_{m2}$ and $CF_d$, the second monitor port may collect light from the $m_d-1$ diffraction order.

The device shown in FIG. 7 is similar to the embodiment of FIG. 3, but is designed to receive one optical signal centered at $CW_{s1}$, and a second optical signal centered at $CW_{s2}$ and any number of additional optical signals. That is, a modulated optical signal enters the input port 701 of the AWG 700. The light traverses an input slab waveguide 702 and enters an array of grating waveguides 703. The grating waveguides have different lengths and thus apply a different phase shift at the exit of each waveguide 703. The light traverses an output slab waveguide 704 and is optically coupled into the output waveguides 705 in such a way that the optical coupling to each output waveguide is wavelength dependent, as described above.

When in tune, the center frequency of the passband of the first data port, $CF_{d1}$, equals $CF_{s1}$, and the center frequency of the passband of the second data port, $CF_{d2}$, equals $CF_{s2}$. For a device with two data ports, the tuning error can be expressed as $\Delta v=\frac{1}{2}[CF_{d1}-CF_{s1}+CF_{d2}-CF_{s2}]$. When the AWG is not in tune, $\Delta v$ is nonzero. Data ports d1 and d2 together with monitor ports m1 and m2 are configured such that $CF_{d1}-CF_{m1}=CF_{m2}-CF_{d2}$ and the monitor port receives a portion of the light from signal s1 (a fringe) when $CF_{s1}=CF_{d1}$ and the monitor port m2 receives a portion of light (a fringe) from signal s2 when $CF_{s2}=CF_{d2}$, in this exemplary embodiment.

Figure 4E:
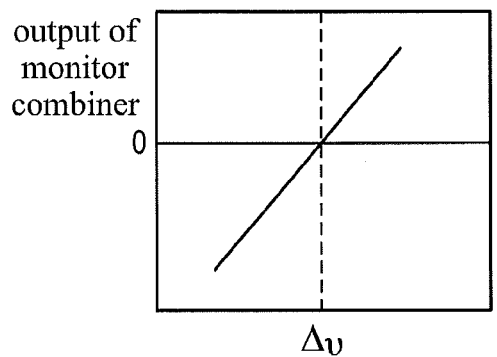

The monitor receivers (MR) 705Ref1 and 705Ref2 are configured so that when s1 and s2 have equal optical powers in this embodiment. When $CF_{s1}-CF_{d1}=CF_{d2}-CF_{s1}$, the output of MR 705Ref1 equals the output of MR 705Ref2 and further that the output of the monitor combiner 708 depends on $\Delta v$ as shown in FIG. 4(e). Devices with two signals s1 and s2 of unequal powers can be accommodated by providing MR 705Ref1 and MR 705Ref2 with different gains so that the monitor combiner output is zero when $\Delta v=0$.

The monitor combiner circuit 708 provides an output to a temperature control circuit 720, which in turn controls a temperature controller 709 that completes a feedback loop to restore the AWG temperature to its optimum value.

FIGS. 8(a)-8(c) are transmissivity plots i.e., plots of insertion loss (IL). FIG. 8(a) shows the transmissivity plots for d1, d2, m1 and m2. FIG. 8(b) shows the power spectral density for s1 and s2 where $\Delta v=0$ so that m1 and m2 receive equal optical powers.

FIG. 8(c) shows the case of when $\Delta v<0$ so that m1 receives more optical power than m2. This results in the monitor combiner 708 having a negative output, which completes the feedback loop to change the heater power and restore the AWG to the optimum state, i.e., in tune.

These concepts can be applied with a thermal electric cooler (TEC) instead of a heater, as mentioned above. In fact, nearly any actuator that affects the value of $CF_d$ (and equally $CF_m$) can be used in place of a heater. It is reiterated that nearly any type of optical demultiplexer can be used instead of an AWG. Analog control electronics can be replaced in whole or in part by digital control electronics. For instance, analog electronics that provide proportional control may be replaced with analog or digital electronics that provide PID control. The monitor port (or ports) may supply signals that feed into an alternative form of feedback control.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A wavelength router device spacially separating at least one fringe of an optical data signal from at least one fundamental portion of an optical data signal, comprising:
   at least one output data port optically coupling at least one fundamental portion of an optical data signal;
   at least one output monitor port optically coupling at least one fringe of an optical data signal;
   at least one monitoring circuit, optically coupled to said output monitor port, converting at least one said fringe to an electrical signal;
   a comparison circuit comparing the output of the at least one monitoring circuit against a reference; and
   a tuning element that tunes the wavelength router according to said signal from said comparison circuit.

2. The wavelength router device of claim 1, wherein said reference is a fixed reference that is independent of any light that may or may not enter the device.

3. The wavelength router device of claim 1, comprising
   a wavelength router spacially separating at least two fringes of an optical data signal from at least one fundamental portion of an optical data signal;

at least one output data port optically coupling at least one fundamental portion of an optical data signal;

a first output monitor port optically coupling a first fringe of an optical data signal;

a second output monitor port optically coupling a second fringe of an optical data signal;

a first monitoring circuit, optically coupled to said first monitor port, converting said first fringe to an electrical signal;

a second monitoring circuit, optically coupled to said second monitor port, converting said second fringe to an electrical signal;

a comparison circuit comparing the output of said first monitoring circuit against a reference signal, wherein the reference signal comprises the output of said second monitoring circuit, and a tuning element that tunes the wavelength router according to said signal from said comparison circuit.

4. The wavelength router device of claim 3, wherein the wavelength router forms a diffraction pattern that spatially separates at least one fundamental portion from a first fringe and spatially separates at least one fundamental from a second fringe.

5. The wavelength router device of claim 4, wherein the wavelength router is an arrayed waveguide grating (AWG).

6. The wavelength router device of claim 3, wherein the wavelength router is one of an etched grating demultiplexer or a Fabry-Pérot interferometer (etalon).

7. The optical router device of claim 4, wherein the optical router forms a diffraction pattern such that a single order of the diffraction pattern spatially divides the optical spectrum into a fundamental portion, and a first fringe having optical frequencies higher than the fundamental portion and a second fringe having optical frequencies lower than the fundamental configured such that the data port outputs the fundamental portion, the first output monitor port outputs the first fringe, and the second output monitor port outputs the second fringe.

8. The optical router device of claim 7, wherein a center frequency of a passband of said at least one monitor port $CF_m$ differs from the frequency of a passband of the data port $CF_d$ by approximately the bandwidth of the spectrum $BW_s$.

9. The optical router device of claim 4, wherein the optical router forms a diffraction pattern to spatially separate the first and second fringes from the fundamental and the first output monitor port, and second output monitor port, and at least one output data port are configured to output light each from a different diffraction order of the diffraction pattern.

10. The optical router device of claim 9, wherein a center frequency of said at least one monitor port $CF_m$ differs from the center frequency of the data port $CF_d$ by approximately 0.5 times the bandwidth of the spectrum $BW_s$.

11. The wavelength router device of claim 1, wherein said monitoring circuit converting an output of said at least one output monitoring port to an electrical signal and comparing the output of said at least one output monitoring port against a reference signal representing an optimal operating temperature of the wavelength router.

12. The optical router device of claim 1, wherein the monitoring circuit includes an optical-to-electrical signal converter, an electrical signal amplifier and a comparator.

13. The optical router device of claim 1, wherein the monitoring circuit includes a proportional-integral-derivative (PID) controller.

14. The optical router device of claim 1, wherein the tuning element is a heater.

15. The optical router device of claim 1, wherein the tuning element is a thermal electric cooler.

16. A method of configuring an optical waveguide router device to have a feedback control, comprising:

configuring an optical waveguide router with an input port and at least one output data port and at least one output monitor port such that each of said at least one data port and said at least one monitor port outputting a different portion of an optical data signal input to said input port;

converting, in a monitoring circuit, an output of said at least one output monitor port to an electrical signal;

comparing, in a comparing circuit, the electrical signal converted from the output of said at least one output monitoring port against 1) a reference signal, or 2) an electrical signal representing at least one output from another output monitoring port, wherein one of the frequencies of the outputs of the output monitoring port or ports is compared is higher frequency fringe of an optical data signal of at least one data port and another one of the frequencies of the outputs of the output monitoring ports being compared is a lower frequency fringe of an optical data signal of at least one data port, or 3) an electrical signal representing at least one output from another output monitoring port, wherein one outputs of the output monitoring port or ports is coupled to light from one order of the diffraction pattern and another of the outputs of the output monitoring port or ports is coupled to light from another order of the diffraction pattern; and controlling the output center wavelength of said at least one output data port of said waveguide router according to said control signal from a comparison circuit.

17. The method of claim 16, wherein the electrical signal converted from output of said at least one output monitoring port is compared to the reference signal.

18. The method of claim 17, wherein said reference is a fixed reference that is independent of any light that may or may not enter the device.

19. The method of claim 16, wherein the electrical signal converted from output of said at least one output port is compared to an electrical signal representing the output from another output monitoring port, wherein one of the frequencies of the output of the output monitoring port or ports is compared is higher frequency fringe of an optical data signal of at least one data port and another one of the frequencies of the outputs of the output monitoring ports being compared is a lower frequency fringe of an optical data signal of at least one data port.

20. The method of claim 16, wherein the electrical signal converted from the output of the at least one output port is compared to an electrical signal representing the output from another output monitoring port, wherein one output of the output monitoring port or ports is coupled to light from one order of the diffraction pattern and another of the outputs of the output monitoring port or ports is coupled to light from another order of the diffraction pattern.

21. An optical waveguide router device with feedback control, comprising:

means for optical waveguide routing with an input port and at least one output data port and at least one output monitor port, each of said at least one data port and said at least one monitor port outputting a different light frequency with respect to the other with respect to an input optical data signal;

means for converting an output of said at least one output monitoring port to an electrical signal;

means for comparing the electrical signal converted from output of said at least one output monitoring port against 1) a reference signal, or 2) an electrical signal representing at least one output from another output monitoring port, wherein one of the frequencies of the outputs of the output monitoring port or ports is compared is higher frequency fringe of an optical data signal of at least one data port and another one of the frequencies of the outputs of the output monitoring ports being compared is a lower frequency fringe of an optical data signal of at least one data port, or 3) an electrical signal representing at least one output from another output monitoring port, wherein one outputs of the output monitoring port or ports is coupled to light from one order of the diffraction pattern and another of the outputs of the output monitoring port or ports is coupled to light from another order of the diffraction pattern; and means for controlling the output center wavelength of said at least one output data port of said optical waveguide router according to said means for comparing.

22. The optical waveguide router device of claim 21, wherein said means for comparing is a means for comparing the output of said at least one output monitoring port to said reference signal.

23. The optical waveguide router device of claim 22, wherein said reference is a fixed reference that is independent of any light that may or may not enter the device.

24. The optical waveguide router device of claim 21, wherein said means for comparing is a means for comparing the electrical signal converted from the output of said at least one output monitoring port to an electrical signal representing said at least one output from another output monitoring port, wherein one of the frequencies of the outputs of the output monitoring port or ports is compared is higher frequency fringe of an optical data signal of at least one data port and another one of the frequencies of the outputs of the output monitoring ports being compared is a lower frequency fringe of an optical data signal of at least one data port.

25. The optical waveguide router device of claim 21, wherein said means for comparing is a means for comparing the electrical signal converted from the output of said at least one output monitoring port to an electrical signal representing said at least one output from another output monitoring port, wherein one outputs of the output monitoring port or ports is coupled to light from one order of the diffraction pattern and another of the outputs of the output monitoring port or ports is coupled to light from another order of the diffraction pattern.

* * * * *